Sept. 27, 1949.  T. J. SMULSKI  2,483,243
FLUID TRANSMISSION CONNECTION FOR CLEANER WIPERS
Filed Feb. 11, 1944  2 Sheets-Sheet 1
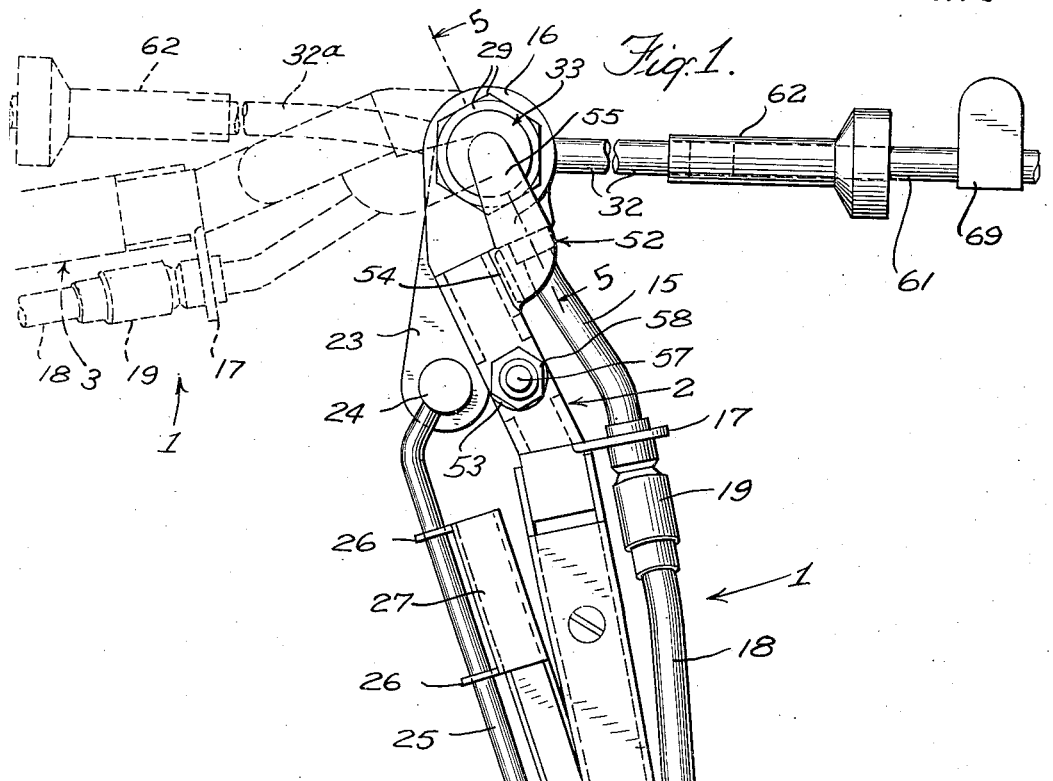
Fig. 1.
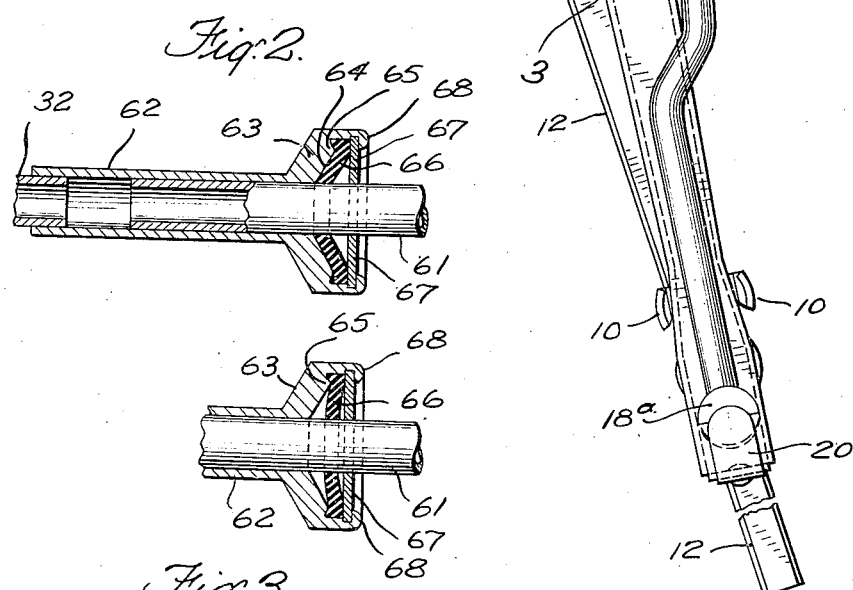
Fig. 2.
Fig. 3.
INVENTOR
THEODORE J. SMULSKI
BY
Clarence M. Crews
ATTORNEY Sept. 27, 1949.                T. J. SMULSKI                 2,483,243
                FLUID TRANSMISSION CONNECTION FOR CLEANER WIPERS
Filed Feb. 11, 1944                                    2 Sheets-Sheet 2
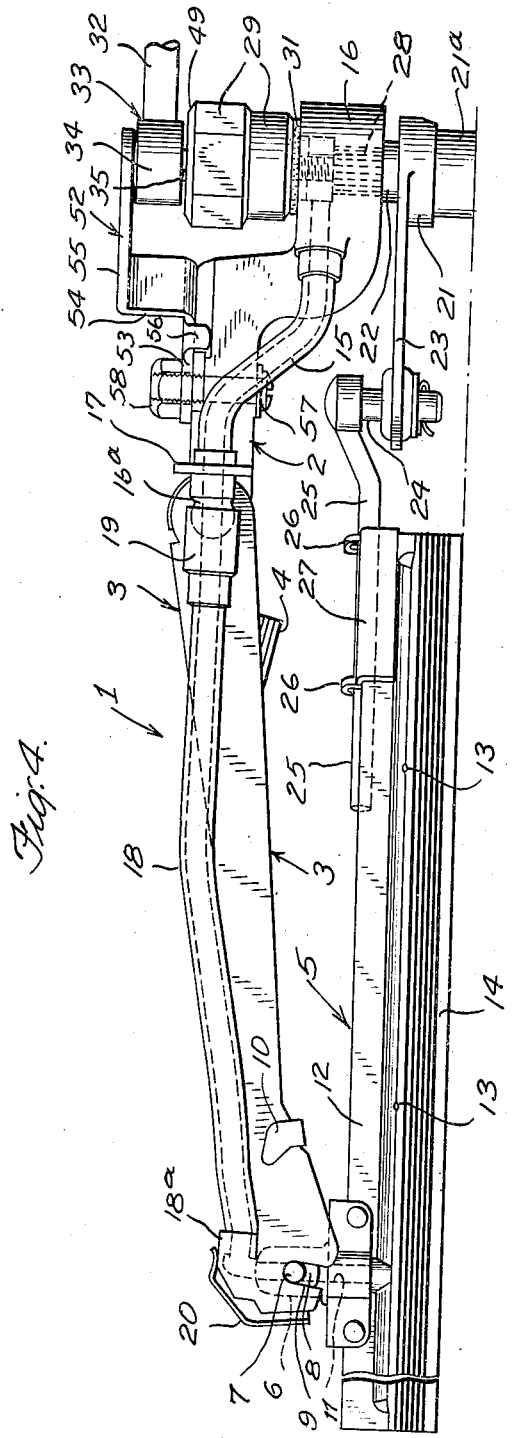
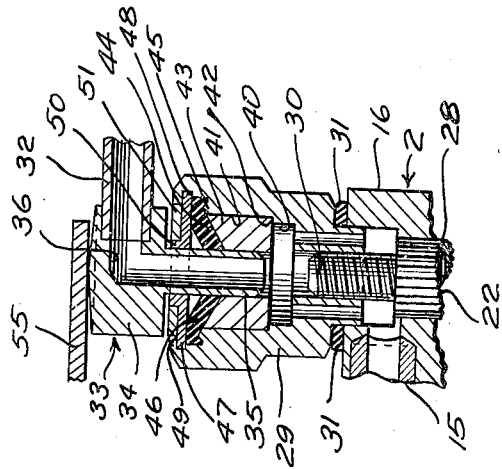
INVENTOR
THEODORE J. SMULSKI
BY
Clarence M. Crews
ATTORNEY Patented Sept. 27, 1949

2,483,243

UNITED STATES PATENT OFFICE 2,483,243

FLUID TRANSMISSION CONNECTION FOR CLEANER WIPERS

Theodore J. Smulski, Gary, Ind., assignor to Productive Inventions, Inc., a corporation of Indiana Application February 11, 1944, Serial No. 521,904

7 Claims. (Cl. 15—250.4)

This invention relates to windshield wipers of the cleaner type; i. e., wipers including oscillatory wiper arm and blade members, and means for delivering a cleaning or de-icing fluid upon the blade-engaged surface of the windshield in proximity to the blade.

The invention is primarily concerned with the conducting of cleaning fluid from a stationary supply tank to the oscillatory wiper arm by which the blade is carried, and particular with the provision of means for enabling the elements of the fluid conducting system to be assembled and disassembled in a fluid tight manner with extreme facility.

In cleaner wipers, the fluid is advantageously introduced into the oscillatory wiper arm through passages formed, respectively, in a wiper arm carried oscillating member and in a non-oscillating member, which members are both disposed substantially in axial alignment with the axis of the wiper arm operating shaft. The oscillatory and non-oscillatory members necessarily have relative oscillatory movement and have bearing portions in engagement with one another. The axis of the drive shaft is regarded as the axis of the oscillatory member, and the axis of the bearing portion of the non-oscillatory member is regarded as the axis of this member. If these axes are cocked with relation to one another, and the stationary member is truly stationary, the engaged portions of the members have a relative gyratory movement, and the nature of the connection between them must be capable of accommodating such relative gyratory movement while assuring a liquid tight joint.

The liquid supply tank is generally located at some distance from the wiper arm or wiper arms to which it supplies cleaning fluid. If ordinary straight metal tubing and usual plumbing fittings are employed for running the connections from the tank to the wiper arm or arms, the tubing must be either cut and threaded by the workman effecting installation, or the parts must be accurately dimensioned at the factory with reference to the predetermined requirements of a particular job. Even then the effecting of the assembly is a job for a skilled plumber or steam fitter.

The tubing has little stretch in service and is apt to be subjected to tensile stress, both by straight pulls and by bending stresses to which it is subjected by road shocks and vibration, (the term "road shocks" being intended to comprehend shocks produced by air bumps in the case of aircraft). These stresses strain the tubing and the joints, and tend particularly to produce leaks at the joints. As a partial correction special supports have been provided in prior structures, but this adds to the elaborateness of the assembly and the labor expense of installation. It also interferes with the opening up of the system for cleaning or for the replacement of worn or damaged parts.

The structure may also be subjected to strain by differential heat expansion of the tubing and of the supporting vehicle structure. In relatively oscillatory parts, pressure produced by heat expansion of metals is great, and the consequent wear of the metallic parts which rub against one another is very rapid. In prior art structures the outside connections which run to the wiper arm have generally acted through heat expansion to put lateral pressure on the relatively oscillating parts which bear against one another.

The present invention includes among its objects the elimination of each and every one of the foregoing difficulties, drawbacks and disadvantages.

It is a particular object of the present invention to provide a windshield wiper and conduit assembly so constructed and arranged that it is of universal applicability, admitting of quick, convenient, and dependably leak proof assembly with straight tubing installed on a vehicle whose terminal portion extends toward, or may be caused to extend toward, the windshield wiper axis, and without requiring any special tools or any special skill.

It is a further salient object of the invention to provide a fluid transmission joint in a windshield wiper organization, which admits of ready disassembly and assembly of parts for cleaning, replacement or repair.

It is a further object of the invention to provide a construction in which the non-oscillatory member is mounted upon, and connected to, the oscillatory member, through a straight cylindrical bearing connection, and in which movements of the non-oscillatory member resulting from a misalignment of axes are accommodated through a yielding conduit connection to the non-oscillatory member which precludes the application of any substantial lateral pressure to the bearing connection. This yielding connection serves also to protect the bearing connection against the application of lateral pressure through differential heat expansion.

It is a further object of the invention to eliminate substantially all tensile strains upon the tubing of the conduit system and to eliminate all joints of a character adapted to be sprung by tensile, torsional or bending strains.

Other objects and advantages will hereinafter appear.

In the drawing forming part of this specification

Fig. 1 is a view in front elevation of a wiper arm and conduit assembly embodying the invention, together with fragments of connected tubing, the wiper blade being broken away intermediate its ends for compactness of illustration, and the lateral conduit structure being shown in full and dotted lines respectively, in two of the many available positions of orientation;

Fig. 2 is a fragmentary view in sectional elevation of a novel joint employed in the construction of Fig. 1, the parts being shown in positions occupied by them before any fluid pressure is developed;

Fig. 3 is a view similar to Fig. 2 showing the relative positions assumed by the parts after some wear;

Fig. 4 is a view in side elevation of the structure illustrated in Fig. 1; and

Fig. 5 is a fragmentary sectional view taken upon the line 5—5 of Fig. 1 looking in the direction of the arrows.

In the drawing, disclosure is made of a cleaner windshield wiper assembly which includes fluid conducting tubing and joints, including a joint forming unit adapting the wiper when installed on the vehicle in a conventional manner to be quickly and easily connected to installed tubing of a supply tank system.

It is an important point that every piece of mechanism which is of special construction is included in this windshield wiper assembly, the only requirements imposed upon the vehicle manufacturer being that the tubing to which the unit is to be attached shall be of substantially a specified diameter, shall have a straight terminal portion directed toward the intended location of the wiper axis so that its prolongation would substantially intersect a definite portion of the wiper shaft axis or the prolongation thereof, and that the tubing shall terminate within a specified range of distance from the wiper axis, which range, however, makes very liberal allowance for individual variations.

The wiper arm proper and the wiper blade, as well as the means for connecting the arm to the blade, and the means for conducting cleaner fluid from the region of the arm axis to and through the blade frame, are not novel with this application and no claim is made herein to these features. All of these parts may be, and desirably are, identical with the corresponding parts shown in Figs. 1 to 13, inclusive, of my pending application, Serial No. 492,252 filed June 25, 1943, for Windshield wiper arm and blade connectors, and described in the specification of said application, which has now matured into Patent Number 2,432,690, Dec. 16, 1947. The general combination of a flexible wiper arm and flexible conduit means carried thereby is disclosed and claimed in said application, Serial No. 492,258 filed June 25, 1943, for Windshield wiper fluid transmission connections.

The means disclosed herein for quickly and positively connecting the wiper blade to the wiper arm in a fluid tight manner is disclosed and claimed in my pending application, Serial No. 492,252 above referred to. This is also true of certain features of the wiper blade construction.

Other features of the wiper blade construction are disclosed and claimed in my pending application, Serial No. 401,951, filed July 11, 1941, for Windshield wiper, which has now matured into Patent Number 2,348,502, May 9, 1944.

The windshield wiper 1 comprises an inner rigid wiper arm section 2 and a channeled wiper arm section 3 pivotally carried thereby which is biased toward the windshield by an adjustable spring unit 4. Details of the adjustable spring unit and of the connection between the wiper arm sections 2 and 3 will not be described in detail, since the construction and operation of this portion of the wiper arm is well understood. For a complete description of these features in a very advantageous form, reference may be had to U. S. Patent No. 2,326,402 granted to me on August 10, 1943.

The wiper blade 5 is connected to the outer end of the arm section 3 through a fluid conducting stem 6 which is provided with trunnions 7. The trunnions 7 of the stem 6 are locked in place through suitable automatic locking mechanism, desirably of the kind disclosed in Figs. 1 to 5, inclusive, of Serial No. 492,252. Since this mechanism forms no part of the novelty of the present invention, it will not be described in detail, it being sufficient to note that a locking member 8 may be drawn rearwardly to a position clear of slots 9 formed in side walls of the channel wiper arm section 4 by operating handles 10, that it may be cocked in a locking position, and that it may be tripped to project the locking member across the slots to trap the trunnions 7 in automatic response to the insertion of the trunnions 7 into the slots 9.

Details of the wiper blade will not be descriped pecause they form no part of the novelty of the present invention, but the point is noted that cleaner fluid, delivered into the blade frame through a passage 11, is conducted through channels formed in the blade frame 12, and discharged through ports 13 which are disposed at opposite sides of the flexible wiping element 14.

The conduit 15 extends from a hub portion 16 of arm section 2 and terminates in a ball member 16a of a ball and socket joint, the center of the ball lying substantially in the pivotal axis of wiper arm section 3. The conduit 15 is further secured to arm section 2 by a bracket 17. A conduit section 18, provided at its inner end with a socket member 19 for receiving and fitting the ball 16a, conducts the cleaner fluid to a terminal block 18a which is seated upon a forward surface of arm section 3 at the outer end thereof, and pressed by a leaf spring 20 into interfitting relation with an opening formed in the outer end of arm section 3.

A sleeve 21, affixed to a stationary sleeve 21a concentric with the shaft 22, includes a fixed arm 23 which is connected through a pivot pin 24 to a guide bar 25. The guide bar 25 extends slidingly through ears 26 formed on a clip 27 which is affixed to the inner end of the frame 12 of wiper blade 5. The crank 23, the guide bar 25, and the clip 27 serve to modify the movement of the wiper blade 5 relative to wiper arm in a well-known manner, causing the blade to be oscillated relative to the wiper arm about the fore and aft axis of the stem 6.

The novel structure of the organization with which the present application is primarily concerned is found in association with wiper arm section 2, and has to do with the conducting of cleaning fluid to the conduit 15.

The wiper arm section 2 is impaled upon a toothed portion 28 of shaft 22. It is clamped in place against a shoulder of the shaft by a nut 29 which is screwed onto an extended threaded portion 30 of the shaft 22, and which bears through a gasket 31 against the forward face of the hub portion 16 of the wiper arm section 2.

The nut 29 oscillates with the windshield wiper arm. In addition to its clamping function, the nut also serves as a fluid transmission element and constitutes an important element of a novel joint unit through which fluid tight connection is made between relatively oscillating members. In describing this portion of the structure, however, it is more convenient to begin with a fluid intake conduit or tube 32 in order that reference to fluid passages shall be mentioned in the order in which the fluid passes through them rather than in the inverse order.

One end of the tube 32 is fitted into an elbow 33 and secured and sealed thereto in any suitable manner, as by brazing or soldering. The elbow member comprises a head portion 34 and a tubular stem portion 35. The elbow member has formed in it an L-shaped passage 36 through which fluid passes from the bore of tube 32.

The stem portion 35 is the equivalent of a piece of straight tubing, and it is inserted into the novel joint unit of which the nut 29 forms an element. The nut 29 is formed with a bore 40, the forward portion 41 of which is enlarged so that its cylindrical inner wall and the shoulder 42 at the inner extremity of the enlarged portion 41 define a socket for the reception of a self-lubricating bearing bushing 43. This bushing may desirably be formed of graphited bronze. The forward face 44 of the bushing 43 is desirably of frusto-conical form, the cone having, as illustrated, an apex angle of substantially 120°. The bushing 43 is made fast with the nut 29, the bushing and nut being, in effect, a single or unitary member.

The bore of the nut 29 is further enlarged at the forward end of the socket 41 to define a forwardly facing shoulder 45 against which a diaphragm 46 of flexible, resilient, deformable material is marginally clamped. As seen in Fig. 5 the shoulder is formed to provide an annular groove spaced outward from the socket wall so that the diaphragm margin when compressed is deformed into the channel to fill it and to form an interlock.

A disk 47 having a plane face opposed to the diaphragm is clamped firmly against the diaphragm to hold it in place. This disk is seated upon a shoulder 48 formed in the nut 29, and is clamped fixedly and permanently against the margin of the diaphragm by a swaging inward of the metal of the nut 29 at the forward extremity thereof to form a lip 49 which overlies and engages the front margin of the disk. The disk 47 includes a central, forwardly extending boss 50 upon which an anti-friction bearing washer 51 is fitted and secured.

The elbow 33 is not secured to the nut 29 nor to any of the parts which are affixed to the nut, otherwise than by simply having its stem portion 35 thrust through a central opening in the disk 47, a central opening in the diaphragm 46, and into a bore of the bearing bushing 43. The opening in the disk 47 and the bore of the bushing 43 constitute passages of substantially the same diameter as the external diameter of stem 35.

The elbow 33 is further retained in place by means of a resilient retaining or hold-down plate 52 which is carried by wiper arm section 2. The retaining plate 52 includes a flat web 53 which bears against the forward face of wiper arm section 2, a forwardly extending web 54, and an inwardly extending flat web 55 which engages the forward face of the elbow 33 and bears against it in the direction of the axis of shaft 22. The web 53 is formed with short rearwardly extending ears 56 which fit against opposite sides of wiper section 2, and is clamped to wiper section 2 by means of a bolt 57 and a cooperating nut 58. The nut 58 is not required to be removed completely from the bolt 57 in order to permit the ears 56 to clear section 2 and thereby permit the retaining plate 52 to be turned to a position out of alignment with the elbow 33.

While the washer 51 is an anti-friction washer and serves to prevent the development of friction in operation, it is pointed out that the elbow 34 needs not exert any substantial pressure against the washer 51 in operation, and that it may even run out of contact with the washer, because engagement of the elbow 34 with the washer 51 is not depended upon for preventing fluid leakage.

On the contrary, the elbow 34 may shift in a fore and aft direction relative to the bushing 43 and the portions associated therewith during operation without in any way impairing the leakproof character of the joint. Fore and aft movement of the elbow 33 may occur with substantial freedom in operation, an important point in the matter of relieving the lateral connecting tubing of bending strains.

The bushing 43 and the diaphragm 46 oscillate with the wiper arm in engagement with the stationary stem 35. Any leakage which tends to occur will have to occur between the outer surface of the stem 35 and the inner surface of the diaphragm 46. The diaphragm, however, in the position illustrated in Fig. 5, is in a deformed condition, the natural resiliency of the material causing it to bear lightly but snugly against the stem 35.

The normal condition of the diaphragm before insertion of the stem 35 is a flat condition, and the hole through the diaphragm is initially somewhat smaller than the outside diameter of the stem 35. The thrusting of the stem 35 through the diaphragm deforms the diaphragm to the conical shape shown with its rear face in engagement with the conical surface 44 of the bushing 43, and it also deforms the diaphragm material by forcing the material outwardly around the opening to permit the passage through the opening of the stem 35. The diaphragm material, as seen in Fig. 5, tends therefore to contract upon the stem and to resume its normal plane condition. It is an important point, however, that the pressure of the diaphragm against the stem is a light pressure, sufficient to maintain an effective seal but not sufficient to produce binding nor rapid frictional wear. The presence of liquid under pressure in the system tends to increase the pressure of the diaphragm against the stem. Any liquid which seeks to escape between the diaphragm 46 and the stem 35 will first have access to the space between the bushing 43 and the diaphragm 46. The hydraulic pressure tending to force escape, therefore, is applied also in a manner tending to force the diaphragm toward the disk 47, and tending further to compress the diaphragm against the stem 35. Since only very moderate hydraulic pressure is employed, objectionably firm gripping of the stem by the diaphragm does not occur.

It is an important point that the unclamped area of the diaphragm is large in relation to the cross-sectional area of the stem 35. As shown in the drawing, the unclamped diaphragm area is more than four times as great as the cross-sectional area of the tube 35. The relatively large size of the diaphragm is very advantageous. It enables the hole through the diaphragm to be enlarged substantially by the insertion of the tube 35 without putting the diaphragm under a sufficient strain to cause objectionably forcible gripping of the stem by the diaphragm. It also enables the center of the diaphragm to be displaced by a considerable amount with only a limited angular deformation of the diaphragm.

As the diaphragm material in contact with the stem 35 is worn away, the diaphragm tends to return toward its initial flat condition and maintain sealing contact with the stem. The fact that the center of the diaphragm can be displaced a substantial distance with only limited deformation of the diaphragm has the consequence that the pressure exerted by the diaphragm against the stem in the fully deformed condition illustrated in Figure 5 does not greatly exceed the pressure applied by the diaphragm to the stem when the diaphragm has nearly returned through wear to its flat condition. The fact that the area of the diaphragm is large provides for a considerable portion of the diaphragm material to be worn away before the diaphragm returns to its flat condition or so nearly to its flat condition that contact with the stem becomes ineffectual.

In operation, axial movement of the elbow 33 relative to the bushing 43 does not involve rubbing of the stem 35 relative to the diaphragm 46. The diaphragm merely flexes, retaining its grip upon the stem unaltered. The principal importance of contriving the parts so that the diaphragm will not be rubbed with great pressure lies in the fact that the diaphragm oscillates with the wiper arm relative to the stem 35. The construction as described has been found to be a very practical and advantageous one, capable of successful operation over a long period of time.

It will be seen that the joint parts described serve to form a leak-proof joint which can be assembled by an unskilled workman without the use of any tools or devices other than those required for relatively rotating the nut 58 and the screw 57. The elbow 34 simply rides upon the nut 29.

The parts can be readily dis-assembled for cleaning, repair, or replacement, simply by loosening the retaining plate 52, swinging it to one side, and lifting the elbow 33 with the connected tube 32 clear of the nut 29. The nut 29 and the parts carried by it can then be replaced by a new similar unit if desired, and the assembly can thereafter be quickly restored in a manner which will now be readily understood.

Not only can the unit of which the nut 29 forms a part be replaced, but, as will be apparent when the connection of the tube 32 in the conduit system is described, the unit of which elbow 33 and tube 32 form parts can also be withdrawn and replaced very readily.

The tube 32, as seen in Figs. 1, 2 and 3, is connected to tubing 61, which may form a separately installed part of a tank and conduit system, through novel joint mechanism resembling the joint formed between the elbow 33 and the nut 29.

The tube 32 fits into the end of a tubular member 62, being desirably brazed or soldered to the member 62. The member 62 has a conical, cup-like enlargement 63 formed at the outer end thereof. The enlargement 63 presents an inner conical surface 64 whose apex angle may desirably be about 120°. The member 63 is also formed to provide a grooved shoulder 65 around the rim of the conical surface 64 against which the margin of a diaphragm 66 of flexible deformable, resilient material is clamped by a flat disc 67. The rim of the member 63 is swaged inward to form a lip 68 for permanently clamping the margin of the disc 67 against the margin of the diaphragm. The disc 67 is formed with an opening having the same diameter as the internal diameter of tube 32, these diameters being such that tubing 61 may be comfortably inserted without binding.

The normal condition of the diaphragm is a flat condition with the diaphragm lying flush against the inner face of disc 67. The hole through the diaphragm is normally smaller in diameter than the external diameter of tube 61. Insertion of tubing 61 displaces the diaphragm 67 to the position illustrated in Fig. 2 with the diaphragm bearing against the conical surface 64 of the member 63. It also deforms the diaphragm material to enlarge the opening in the diaphragm 66.

The principles of construction and operation of this joint are the same as those of the joint formed between the elbow 33 and the nut 29, save that no extensive oscillation occurs between the joint forming parts. The tubular portion 62 is of considerable length, having a clear bore length for reception of the tube 61 of perhaps one and one half inches, or so. This is a very advantageous feature, since it eliminates exacting requirements as to the point of termination of the tube 61. The overlapped portions of tubes 61 and 62 reinforce one another and make the joint resistant to bending strains.

This joint is not subject to damage, other than normal wear incident to the rubbing of metal against rubber or metal against metal, by tensile or torsional strains. Bending strains do not produce binding. Neither do bending strains produce tension in the parts, because of the freedom for relative longitudinal movement of the tubes 61 and 62 which is admitted.

When the windshield wiper unit as shown in Fig. 1 is to be applied to a vehicle, the arm section 2 and the crank 21 are fitted on the shaft 22 in the normal way. The nut 29 is then applied to the threaded stem 30 and tightened. The elbow unit, together with the connected tubing and joint member are then connected to the tube 61 simply by relative movement causing the tube 61 to pass through the disc 67 and the diaphragm 66 and to enter the tube 62. The elbow 33 is then applied to the unit of which nut 29 forms a part, and the retaining plate 52 is positioned over the elbow 33 and clamped securely in place by the threading together of the bolt 57 and the nut 58.

It will be observed that the elbow 33 is free to be turned about the axis of the wiper arm to any position of orientation desired, depending upon the radial direction in which the tube 61 extends. For example, as shown in full lines in Fig. 4, the tube 32 may be caused to extend toward the right from the axis of the wiper arm for connection to the installed tube 61. On the other hand, however, the tube 32 can be extended toward the left as indicated at 32a of Fig. 1 in broken lines. These are only selected, illustrative positions.

The telescoping tubes 62 and 61 are relied upon to restrain oscillation of the elbow 33 with the wiper arm, there being no need for anchoring the tube 32, nor the elbow 33 to the frame of the vehicle. The tube 61 is however, desirably fixed in place on the vehicle body by means of a clip or bracket 69, this detail being taken care of by the vehicle manufacturer. By locating the bracket 69 near the point where the tube 61 enters the tube 62, and by making the combined lengths of tubes 32 and 62 fairly long, so that the tube 61 has the benefit of a long lever arm in resisting the oscillation of the elbow 33, a very satisfactory and practical construction is realized. The combined effect of the two joints is to provide freedom of the conduit system from strain axially and laterally of the wiper shaft.

I have described what I believe to be the best embodiment of my invention. I do not wish, however, to be confined to the embodiments shown, but what I desire to cover by Letters Patent is set forth in the appended claims.

What is claimed is:

1. In a windshield wiper mechanism which includes an oscillatory wiper arm adapted to transmit cleaning fluid to the windshield from a stationary source of supply, in combination, a wiper arm section adapted for attachment to an operating shaft for oscillation thereby, said wiper arm section being formed with a fluid transmitting passage, a fluid transmitting joint unit having an axial passage therein and secured in fixed, substantially coaxial relation with the wiper arm section, and in fluid transmitting communication therewith, a second joint unit axially inserted in fluid transmitting coaxial relation with the first and with capacity for relative axial movement and for relative rotatory movement of the joint units, and a retaining member carried by the wiper arm section in position to overlie the second joint unit and limit movement thereof in the direction of the shaft axis.

2. In a windshield wiper mechanism which includes an oscillatory wiper arm adapted to transmit cleaning fluid to the windshield from a stationary source of supply, in combination, a wiper arm section adapted for attachment to an operating shaft for oscillation thereby, said wiper arm section being formed with a fluid transmitting passage, a fluid transmitting joint unit having an axial passage therein and secured in fixed, substantially coaxial relation with the wiper arm section, and in fluid transmitting communication therewith, a second joint unit in the form of an elbow axially inserted in fluid transmitting coaxial relation with the first joint unit and with capacity for relative axial movement of the joint units, and for relative rotatory movement of the joint units both to admit of relative oscillation in operation and of relative adjustment for orientation of the second joint unit, a retaining member carried by the wiper arm section in a retaining position to overlie the second joint unit and limit movement thereof in the direction of the shaft axis, and means for releasably securing the retaining member in retaining position.

3. In a windshield wiper mechanism which includes an oscillatory wiper arm adapted to transmit cleaning fluid to the windshield from a stationary source of supply, in combination, a wiper arm section adapted for attachment to an operating shaft for oscillation thereby, said wiper arm section being formed with a fluid transmitting passage, a fluid transmitting joint unit including a threaded member having screwed connection with the operating shaft for securing the wiper arm section to the shaft, said unit being thereby secured in fixed, substantially coaxial relation with the wiper arm section, and in fluid transmitting communication therewith, a second separable joint unit axially inserted in leak-proof fluid transmitting coaxial relation with the first and with capacity for relative axial movement and for relative rotatory movement of the joint units, a retaining member carried by the wiper arm section in a retaining position to bear against the second joint unit in the direction of the shaft axis, and means for releasably securing the retaining member in retaining position.

4. In a windshield wiper mechanism which includes an oscillatory wiper arm adapted to transmit cleaning fluid to the windshield from a stationary source of supply, in combination, a wiper arm section adapted for attachment to an operating shaft for oscillation thereby, said wiper arm section being formed with a fluid transmitting passage, a fluid transmitting joint unit secured in fixed, substantially coaxial relation with the wiper arm section, and in fluid transmitting communication therewith, a second joint unit axially inserted in leakproof, fluid transmitting coaxial relation with the first and with capacity for relative axial movement and for relative rotatory movement of the joint units, one of said joint units comprising a straight tubular part, and the other comprising a diaphragm chamber having opposed substantially flat and concave conical walls and a deformable elastic diaphragm marginally clamped between said walls, the wall forming members having aligned central passages each of substantially the same diameter as the external diameter of said straight tubular part for the reception of the latter, and the diaphragm being normally substantially flat and having a concentric opening of smaller normal diameter than the external diameter of said straight tubular part, which may be enlarged by deformation to permit insertion through it of the straight tubular portion of the first joint unit.

5. In a windshield wiper mechanism which includes an oscillatory wiper arm adapted to transmit cleaning fluid to the windshield from a stationary source of supply, in combination, a wiper arm section adapted for fixed attachment to an operating shaft for oscillation thereby, said wiper arm section being formed with a fluid transmitting passage, a fluid transmitting joint unit secured in fixed, substantially coaxial relation with the wiper arm section, and in fluid transmitting communication therewith, a second joint unit axially inserted in fluid transmitting coaxial relation with the first and with capacity for relative axial movement and for relative rotatory movement of the joint units, a resilient retaining plate carried by the wiper arm section in position to bear against the second joint section in the direction of the shaft axis, and means for releasably securing the retaining plate in retaining position comprising a threaded clamping member carried by the wiper arm section and passed through the hold-down member.

6. In a windshield wiper mechanism which includes an oscillatory wiper arm adapted to transmit cleaning fluid to the windshield from a stationary source of supply, in combination, a wiper arm section adapted for fixed attachment to an operating shaft for oscillation thereby, said wiper arm section being formed with a fluid transmitting passage, a fluid transmitting joint unit secured in fixed, substantially coaxial relation with the wiper arm section, and in fluid transmitting communication therewith, a second joint unit axially inserted in fluid transmitting coaxial relation with the first and with capacity for relative axial movement and for relative rotatory movement of the joint units, a resilient retaining plate carried by the wiper arm section in position to bear against the second joint unit in the direction of the shaft axis, and means for releasably securing the retaining plate in retaining position, comprising a threaded clamping member carried by the wiper arm section and passed through the retaining plate, said retaining plate including ears which engage side portions of the wiper arm section to secure the retaining plate against angular movement relative thereto.

7. In a windshield wiper mechanism which includes an oscillatory wiper arm adapted to transmit fluid to the windshield from a source of supply, in combination, a wiper arm section adapted for attachment to an operating shaft for oscillation thereby, said wiper arm section being formed with a fluid transmitting passage, a fluid transmitting joint unit having an axial passage therein and secured in fixed, substantially coaxial relation with the wiper arm section, and in fluid transmitting communication therewith, a second joint unit axially inserted in fluid transmitting coaxial relation with the first and with capacity for movement with respect to said first joint unit, and a retaining member mounted to limit movement of said second joint unit in the direction of the shaft axis.

THEODORE J. SMULSKI.

REFERENCES CITED

The following references are of record in the file of this patent:

UNITED STATES PATENTS

| Number | Name | Date |
|--------|------|------|
| 1,801,373 | Stevens | Apr. 21, 1931 |
| 1,868,783 | Williams | July 26, 1932 |
| 2,094,889 | Hooper | Oct. 5, 1937 |
| 2,168,202 | Grantham | Aug. 1, 1939 |
| 2,354,440 | Brown | July 25, 1944 |